US009417902B1

(12) United States Patent
Noonan

(10) Patent No.: US 9,417,902 B1
(45) Date of Patent: Aug. 16, 2016

(54) MANAGING RESOURCE BURSTING

(71) Applicant: Amazon Technologies, Inc., Seattle, WA (US)

(72) Inventor: Steven Michael Noonan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 53 days.

(21) Appl. No.: 14/223,448

(22) Filed: Mar. 24, 2014

(51) Int. Cl.
*G06F 9/455* (2006.01)

(52) U.S. Cl.
CPC .................................. *G06F 9/45533* (2013.01)

(58) Field of Classification Search
None
See application file for complete search history.

(56) References Cited

U.S. PATENT DOCUMENTS

| | | | | |
|---|---|---|---|---|
| 2006/0184937 A1* | 8/2006 | Abels et al. | .................. | 718/1 |
| 2007/0079308 A1* | 4/2007 | Chiaramonte et al. | ............ | 718/1 |
| 2010/0251234 A1* | 9/2010 | Oshins | .............. | 718/1 |
| 2010/0306163 A1* | 12/2010 | Beaty et al. | .................. | 706/52 |
| 2011/0131589 A1* | 6/2011 | Beaty et al. | .................. | 719/318 |
| 2011/0173608 A1* | 7/2011 | Buragohain et al. | ............ | 718/1 |
| 2011/0252271 A1* | 10/2011 | Frenkel et al. | ............ | 714/4.1 |
| 2012/0011499 A1* | 1/2012 | Conover et al. | .................. | 718/1 |
| 2012/0079480 A1* | 3/2012 | Liu | ................ | 718/1 |
| 2012/0131194 A1* | 5/2012 | Morgan | ............ | 709/226 |
| 2012/0137289 A1* | 5/2012 | Nolterieke et al. | ............ | 718/1 |
| 2012/0297236 A1* | 11/2012 | Ziskind et al. | .................. | 714/3 |
| 2013/0054426 A1* | 2/2013 | Rowland et al. | ............ | 705/27.2 |
| 2013/0055258 A1* | 2/2013 | De et al. | ............ | 718/1 |
| 2013/0117494 A1* | 5/2013 | Hughes | ............ | G06F 9/5077 711/6 |
| 2013/0232498 A1* | 9/2013 | Mangtani et al. | ............ | 718/104 |
| 2013/0235874 A1* | 9/2013 | Ringdahl et al. | ......... | 370/395.53 |
| 2013/0305245 A1* | 11/2013 | Doddavula et al. | ............... | 718/1 |
| 2014/0032405 A1* | 1/2014 | Kurabayashi et al. | ......... | 705/40 |
| 2014/0053151 A1* | 2/2014 | Heninger | ............. | G06F 9/5083 718/1 |
| 2014/0082612 A1* | 3/2014 | Breitgand et al. | ................ | 718/1 |
| 2014/0089917 A1* | 3/2014 | Attalla et al. | ..................... | 718/1 |
| 2014/0137104 A1* | 5/2014 | Nelson et al. | ..................... | 718/1 |
| 2014/0164618 A1* | 6/2014 | Alicherry et al. | ............ | 709/226 |
| 2014/0189682 A1* | 7/2014 | Crudele | ............. | G06F 9/45558 718/1 |
| 2014/0223233 A1* | 8/2014 | Heyrman et al. | ............... | 714/23 |
| 2014/0258519 A1* | 9/2014 | Liu | ............................. | 709/224 |
| 2014/0280970 A1* | 9/2014 | Pijewski et al. | ............... | 709/226 |
| 2015/0067262 A1* | 3/2015 | Uttamchandani et al. | .... | 711/129 |

* cited by examiner

*Primary Examiner* — Emerson Puente
*Assistant Examiner* — Mehran Kamran
(74) *Attorney, Agent, or Firm* — Lee & Hayes, PLLC

(57) ABSTRACT

Functionality is disclosed herein for managing resource bursting and other operational characteristics of software executing on a virtual machine instance. The mechanism disclosed herein may receive a request to initialize a virtual machine instance. The request might include a virtual machine instance type and a weight value. The virtual machine instance may be instantiated by establishing a virtual machine of the virtual machine instance type and associating the weight value therewith. The utilization of resources by the virtual machine instance may be monitored and the weight value may be adjusted based upon the monitoring. The adjusted weight value might also be utilized when instantiating new virtual machine instances for the same user and/or customer of a service provider network.

13 Claims, 9 Drawing Sheets

MANAGING RESOURCE BURSTING

BACKGROUND

In a virtualization system, the hardware resources of a host computer are abstracted and presented as one or more individual virtual machines. Each virtual machine may host a separate instance of an operating system ("OS"). A virtual machine monitor ("VMM") executing on the host computer may be responsible for allocating processor time and memory among the virtual machines, and for mediating access to shared resources. The VMM may attempt to fairly allocate limited hardware resources, such as processor time and memory, to each virtual machine to ensure that the OS hosted by each virtual machine performs as desired.

The VMM may predicate allocation of these limited resources upon adherence of the virtual machines to guidelines associated with intended functionality of a particular form of a virtual machine instance type. For example, some virtual machine instance types may include guidelines stipulating that a virtual machine may use "bursts" of resources, if necessary, for a specified window of time. However, program code configured to execute through these virtual machine instance types may violate these guidelines to enable consuming more hardware resources than would otherwise be available and, in effect, saturate resources with requests for consuming compute cycles. This may result in the OS and programs executing in one virtual machine causing a "noisy neighbor" effect and adversely impacting the performance of the programs executing in the other virtual machines. Furthermore, should a particular VMM for a host system determine that these violations are occurring and terminate the virtual machine instance, conventional systems would allow a similar virtual machine instance to be instantiated on another host system and, therefore, to continue the detrimental behavior.

The disclosure made herein is presented with respect to these and other considerations.

DETAILED DESCRIPTION

Figure 1:
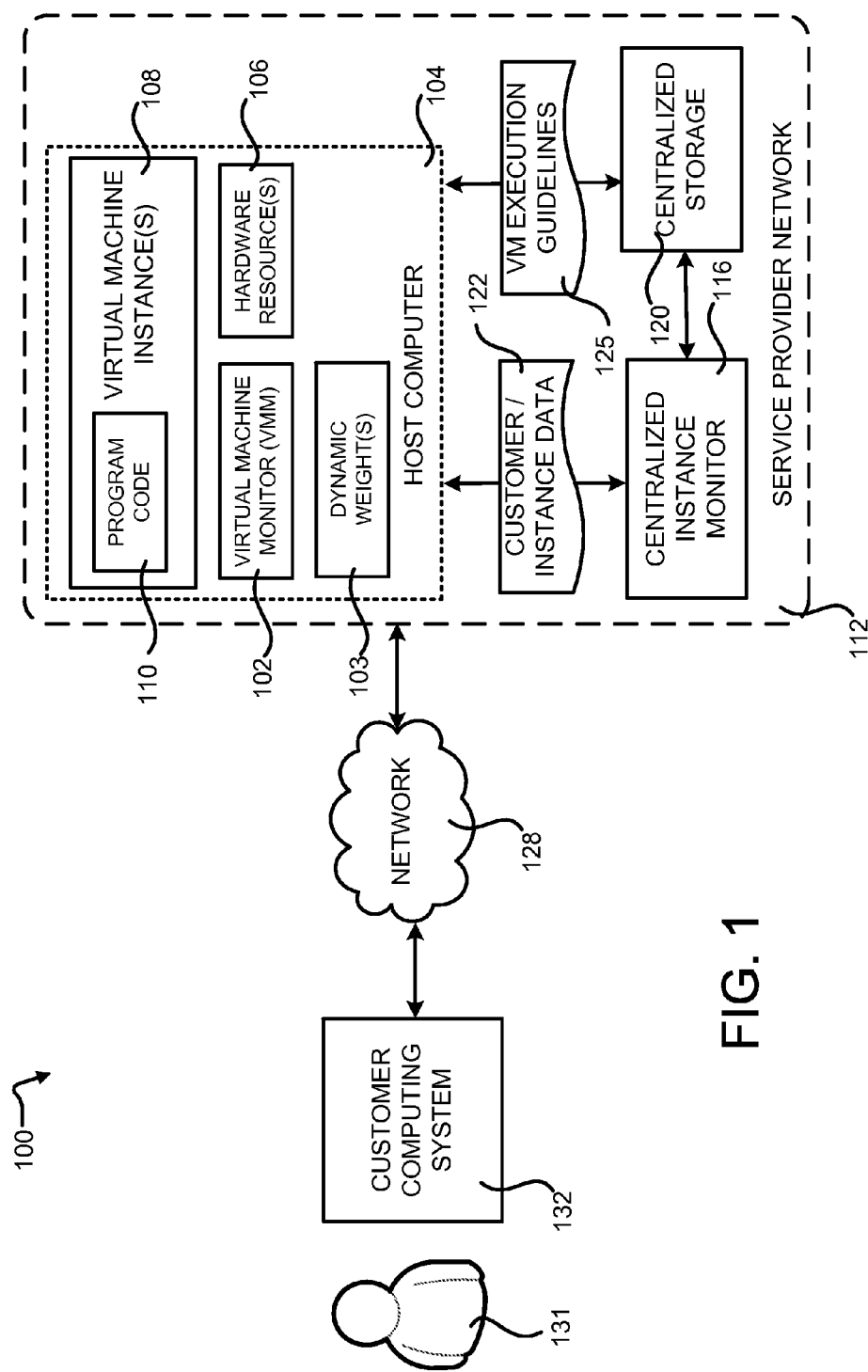
FIG. 1 is a diagram showing aspects of an illustrative virtualization system, including several software and hardware components provided by embodiments presented herein.

The following detailed description is directed to technologies for managing resource bursting. As discussed above, while a virtual machine manager ("VMM") may attempt to fairly allocate processor time and memory to each virtual machine on a host computer, some virtual machine instance types may allow resource bursting which can, under some circumstances, be abused by certain types of software. This can result in the programs executing in one virtual machine adversely impacting the performance of the programs executing in the other virtual machines.

Utilizing the technologies described herein, a VMM may manage resource bursting by monitoring utilization violations by the programs executing in a particular virtual machine, and penalizing that virtual machine (or a customer associated with that virtual machine) through a dynamic weighting system for allocation of extra resources. Virtual machines hosting operating systems ("OSs") and/or other programs violating the guidelines associated with a particular virtual machine instance type will have a dynamic weight associated with extra resource allocation adjusted based on the type or duration of the violation. In this way, the impact of abusive programs on programs executing in other virtual machines on the same host computer may be reduced and the "noisy neighbor" effect may be mitigated.

According to one embodiment, the VMM monitors resource utilization to determine if a virtual machine instance has or is currently violating Virtual Machine ("VM") execution guidelines for the virtual machine instance type. Generally, VM execution guidelines for a particular virtual machine instance type are a set of rules for resource utilization by the virtual machine instance under normal operating conditions. The VM execution guidelines may set forth thresholds and maximum values of use for any available computer resource that might be allocated to a virtual machine instance. According to some embodiments, the VM execution guidelines also include thresholds and maximum values of use under other operating conditions as well. Upon detecting a violation of the guidelines, the VMM may alter a dynamic weight associated with that particular instance such that future requests for extra resources (e.g., resources typically used for bursting) are weighted less than those from other, non-violating virtual machine instances during resource allocation by the VMM.

Additionally, the dynamic weight, virtual machine instance identification information, and other such metadata may be transmitted to a centralized location for centralized monitoring of an actual customer's utilization characteristics. Thereafter, should the same customer request initialization of a new virtual machine instance at a separate host computer in a potential attempt to again violate usage guidelines, the dynamic weight may "follow" the customer across the disparate host computers such that future violations may be mitigated. In this manner, the techniques described herein may manage resource bursting and enforce usage guidelines to increase overall customer satisfaction.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a diagram of an exemplary virtualization architecture 100, according to embodiments. The virtualization architecture 100 includes a VMM 102, such as a hypervisor, that allows multiple operating systems to concurrently execute on a single host computer 104. The VMM 102 abstracts the hardware resources 106 of the host computer 104 in order to enable to execution of one or more virtual machine instances 108 (which might also be referred to herein as "virtual machines"). The VMM 102 is configured to monitor virtual machine instances 108 and adjust the dynamic weights 103 associated therewith. The adjusted dynamic weights 103 establish a scheduling priority for resource allocation for each of the monitored virtual machine instances 108. The VMM 102 may be implemented in the hardware of the host computer 104, or it may be implemented as a software module that executes at a low-level in the host computer to provide services to the virtual machines 108.

Each virtual machine instance 108 may host an instance of a guest OS and may execute associated program code 110 configured to run in the guest OS. According to one embodiment, the VMM 102 may support both paravirtualized and fully-virtualized guest OSs for the virtual machine instances 108. A paravirtualized guest OS is modified to run in a virtual machine 108 provided by the VMM 102, while a fully-virtualized guest OS may be an unmodified version of an operating system that is unaware that it is operating in a virtual machine. Guest OSs may include the MICROSOFT® WINDOWS® operating system from MICROSOFT Corporation of Redmond, Wash., the ORACLE® SOLARIS operating system from ORACLE® Corporation of Redwood City, Calif., the LINUX operating system, the UNIX operating system, the NetBSD operating system, and the like. It will be appreciated that the embodiments described herein are applicable to other virtualization architectures beyond the illustrative virtualization architecture 100 described above and shown in FIG. 1.

As further shown in FIG. 1, host computer 104 may exist as a portion of a service provider network 112 configured to manage individual host computers as part of a distributed computing environment and provide software as a service ("SAAS") or services in a distributed execution environment. The service provider network might also include one or more centralized instance monitors 116 and centralized storage resources 120 configured to process and store customer and virtual machine instance data 122 and to provide VM execution guidelines 125.

The customer and virtual machine instance data 122 may include a previously adjusted dynamic weight (such as dynamic weight 103) by which VMM 102 can weigh resource allocation requests for a particular customer's virtual machine instance, or a particular virtual machine instance. As used herein, a particular customer represents a customer, user, or group of users of a service provider network that provides computing resources, such as virtual machine instances, on an on-demand basis. The data 122 may include a customer identification number ("ID"), a virtual machine identification number or machine image ID, or any other suitable information. Furthermore, the data 122 may be used as a functional profile to appropriately track resource utilization across disparate host computers 104. Thus, as customer usage metrics are monitored and stored through the centralized instance monitor 116 and centralized storage 120, many further uses for the data 122 may be realized.

According to one embodiment, data 122 may be used to determine if undesirable data-mining operations are being performed through virtual machine instances. This can then be used to "blacklist" or limit a particular user's access to new virtual machine instances. Similarly, data 122 may be used to determine if a particular customer's account has been recently hijacked for use in data-mining operations. Thereafter, any new virtual machine instances may be more closely monitored or a warning message may be transmitted to a user. Further uses of the resource utilization information 122 may also be realized, and are considered to be within the scope of this disclosure.

The VM execution guidelines 125 are guidelines for a particular virtual machine instance type, and include a set of rules for resource utilization by the virtual machine instances 108 under normal operating conditions. The VM execution guidelines 125 set forth thresholds and maximum values of use for any available hardware resources 106 that might be allocated to virtual machine instances 108. According to one embodiment, the VM execution guidelines 125 include one or more values of a maximum amount of resources that can be used for resource bursting, maximum lengths of time for a period of resource bursting, and any other suitable guidelines. It is noted that although particularly illustrated as being stored in centralized storage 120, the VM execution guidelines 125 can be stored in individual host computers 104 or by any other mechanism.

Generally, the centralized instance monitor 116 and centralized storage 120 may exist on a separate host computer, or computers, similar to host computer 104, and may be centralized to enable communication with a particular number of host computers 104 and/or associated VMMs 102. Aspects of one particular arrangement of the centralized instance monitors 116 and centralized storage 120 will be described more fully with reference to FIG. 6.

As further shown in FIG. 1, the service provider network may be in communication with one or more customer computing systems 132 being used by customers 131, over a network 128. The customer computing systems 132 may allow the customers 132 to access the service provider network 112 and instantiate virtual machine instances 108, including user-provided program code 110. The customers 131 may request a particular virtual machine instance be initiated on host computer 104 and to utilize the resources of host computer 104 for a period of time. For example, users 131 may implement web servers or other types of functionality through the virtual machine instances 108.

According to one embodiment, the VMM 102 controls the allocation and sharing of hardware resources 106 of the host computer 104 among the virtual machine instances 108 executing on the host computer 104. The hardware resources 106 may include central processing units ("CPUs") or processors, physical memory, network interfaces, storage devices, input/output ("I/O") controllers, and the like. For example, each virtual machine instance 108 may be allocated a portion of the physical memory, a portion of CPU compute cycles, and other resources of the host computer 104 over time, depending on the requirements of the hosted guest OS and/or parameters specified by an administrator. Program code 110 executing on the virtual machine instances 108 may then access and utilize these resources.

According to one embodiment, virtual machine instances 108 may include at least one virtual machine instance type that allows for resource bursting on an as-needed basis, which is allocated by the VMM 102 based on the dynamic weights 103 described above. Various illustrative virtual machine instance types will be described more fully below with reference to FIG. 7.

As used herein, the term resource bursting refers to allowing a particular virtual machine to use more resources than those already allocated to the virtual machine instance, resulting in a temporary performance boost. For example, one type of resource bursting is CPU bursting, where a virtual machine instance may use more compute cycles than typical for a limited period of time. Other forms of resource bursting including increasing memory bandwidth, I/O utilization, storage access, and other suitable types of bursting may also be incorporated in any particular virtual machine instance type.

Figure 2A:
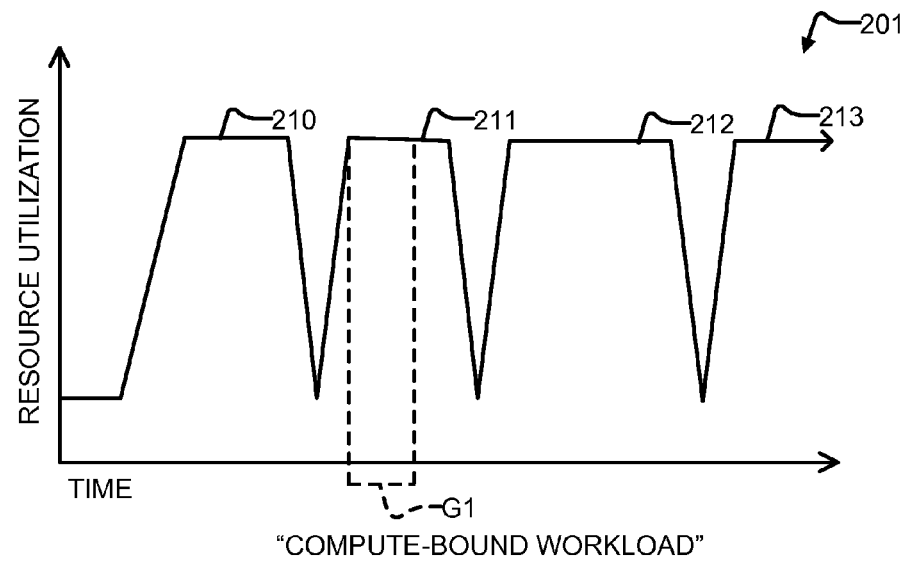
FIGS. 2A and 2B depict example graphs of resource utilization mapped over time for compute-bound loads and latency-bound loads, respectively.
Figure 2B:
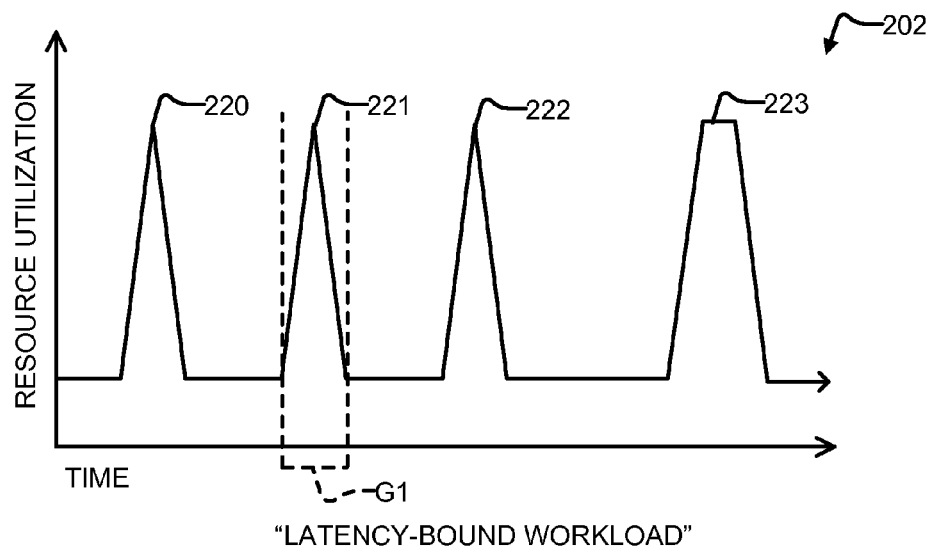

As described above, certain virtual machine instances 108 (or associated customers 131) may attempt to over-utilize resource bursting or abuse VM execution guidelines 125 associated with resource bursting for a particular virtual machine instance. For example, program code 110 executing on virtual machine instances 108 could repeatedly request resources outside the bounds of the thresholds and maximum values set forth in the VM execution guidelines 125. The requests could also attempt to hold or use resources for time periods greater than those set forth in the VM execution guidelines 125 for the particular virtual machine instance type. FIGS. 2A and 2B illustrate example graphs depicting two different types of workloads, which may be processed by a virtual machine 108.

FIG. 2A shows a graph 201 illustrating aspects of a compute-bound workload that includes periods 210, 211, 212, and 213 of relatively large resource utilization. These time periods of extensive resource use may burden a host computer 104 and cause a noisy-neighbor effect. For example, during any time period 211-213, other virtual machine instances requesting increased resources may not be allocated the same, resulting in decreased performance, increased submission delays, increased task completion delays, and decreased user satisfaction. As illustrated, an example time period guideline G1 is superimposed on time period 211. The time period guideline G1 may set forth a maximum length of time for an individual period of resource bursting. As shown, the time period 211 is longer than the time period guideline G1. Therefore, the compute-bound load illustrated in FIG. 2A may be determined to be in violation of guidelines associated with limited resource bursting by VMM 102.

FIG. 2B shows a graph 202 illustrating a latency-bound workload that includes periods 220, 221, 222, and 223 of relatively short bursts of resource utilization. These time periods of short bursts may allow other virtual machine instances on the same host computer to function relatively normally, and may allow for appropriate resource allocation should other virtual machine instances require additional resources. As illustrated, the example time period guideline G1 is superimposed on time period 221. As shown, the time period 221 is shorter than the time period guideline G1. Therefore, latency-bound workload 202 may be determined to be operating within the confines of guidelines associated with limited resource bursting by VMM 102.

Accordingly, the virtual machine instance implementing the workload illustrated in FIG. 2B may have a dynamic weight associated therewith that is relatively higher than a dynamic weight associated with the virtual machine instance implementing the workload illustrated in FIG. 2A. As such, when allocating resources between virtual machines 108, the virtual machine 108 implementing the workload shown in FIG. 2B may be allocated resources preferentially as compared to a virtual machine 108 implementing workload illustrated in FIG. 2A. In this manner, the VMM 102 may balance resource bursting between virtual machine instances 108 such that performance of guideline-abiding virtual machines 108 is not reduced, while virtual machines 108 abusing the same guidelines will be limited in resource consumption when the resources may be needed elsewhere. Additional details regarding this process are provided below.

Figure 2C:
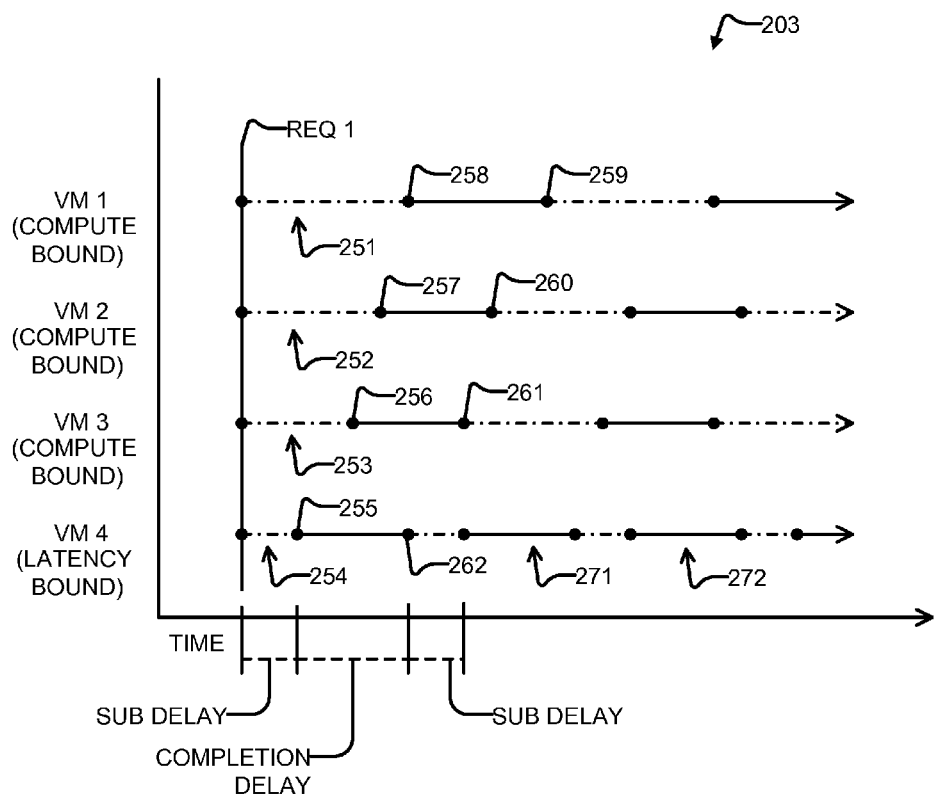
FIG. 2C depicts an example chart of weighted scheduling between compute-bound loads and latency-bound loads.

FIG. 2C depicts an example chart 203 of weighted scheduling between compute-bound loads and latency-bound loads. As illustrated, VM 1, VM 2, and VM 3 represent virtual machines having substantially compute-bound workloads. Furthermore, VM 4 represents a virtual machine having a substantially latency-bound workload. Upon receiving a new request REQ 1 for resource allocation from each of the virtual machines, the VMM 102 takes into consideration dynamic weights 103 for each virtual machine VM 1-VM 4.

As depicted in chart 203, submission delays 251, 252, 253, and 254 between receipt of REQ 1 and subsequent acknowledgements 255, 256, 257, and 258 are apparent. Furthermore, the submission delays 251, 252, and 253 of the compute-bound workloads of virtual machines VM 1-VM 3, are substantially greater than the submission delay 254 of the latency-bound workload of virtual machine VM 4. Accordingly, completion delays of associated tasks are impacted as well. For example, points 259, 260, 261, and 263 represent points in time where tasks of virtual machines VM 1-VM 4 are complete.

As shown, virtual machine VM 4 completes associated tasks relatively faster than virtual machines VM 1-VM 3, thereby allowing additional tasks 271 and 272 to be completed in a fair manner due to the dynamic weighting disclosed herein. Accordingly, submission delays are reduced for virtual machines adhering to the guidelines 125, while being increased for virtual machines in violation of the guidelines 125. Furthermore, completion delays may also be improved for virtual machines adhering to the guidelines 125. Additional details regarding managing resource bursting in virtual machines by the VMM 102 and centralized instance monitor 116 are provided below with reference to FIGS. 3-4.

Figure 3:
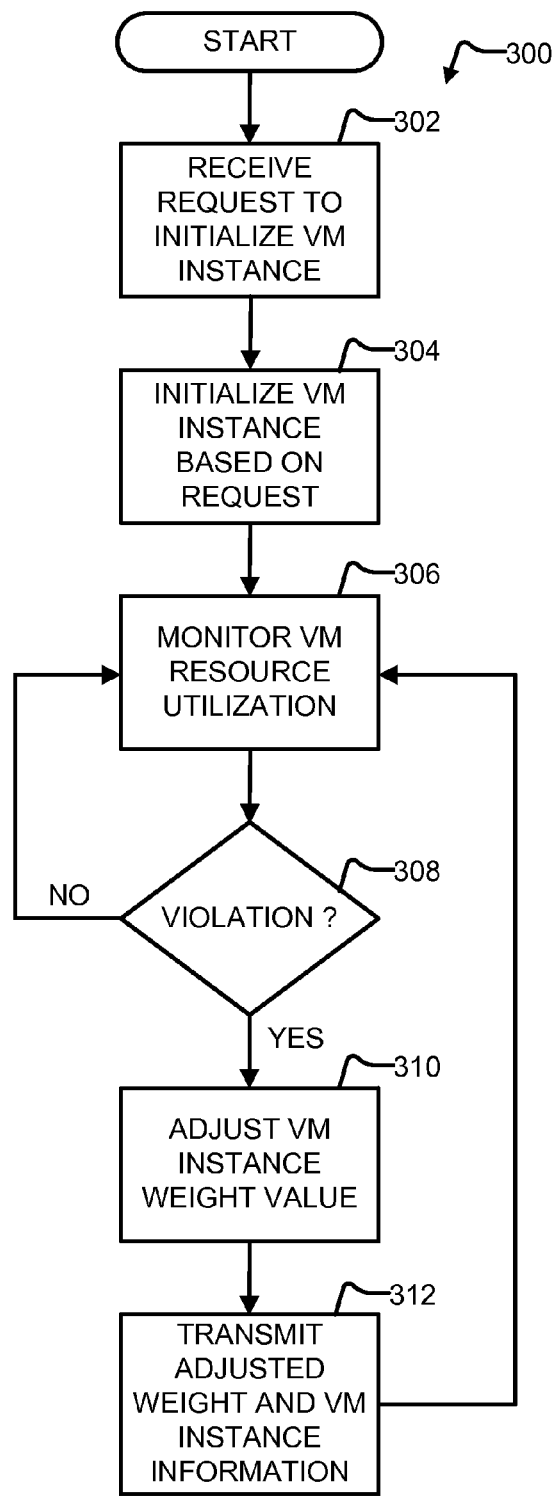
FIG. 3 is a flow diagram illustrating aspects of the operation of a virtual machine monitor that is configured for integration with a service provider network, according to one embodiment disclosed herein.

Turning now to FIG. 3, additional details will be provided regarding the embodiments presented herein for managing resource bursting in virtual machines. It should be appreciated that the logical operations described herein with regard to FIG. 3, and the other FIGS., are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 is a flow diagram showing a method 300 that illustrates aspects of the operation of a virtual machine monitor (e.g., VMM 102) that is configured for integration with a service provider network (e.g., service provider network 112), according to one embodiment disclosed herein. As shown in FIG. 3, the method 300 includes receiving a request to initialize a virtual machine instance at block 302. The request may include an initial weight by which to weigh resource allocation requests for the virtual machine instance. According to one embodiment, the initial weight is either a default weight based on the instance type (e.g., a weight of 1) or a previously adjusted weight based on customer or instance data 122 provided by the centralized instance monitor 116. Alternatively, the initial weight may not be provided with the request. Therefore, the initial weight could be retrieved from a suitable location, for example, in response to receiving the request to initialize the virtual machine instance.

The method 300 further includes initializing the virtual machine instance 108 based on the received request at block 304. The initializing may include setting a current dynamic weight 103 to the weight received in the request or obtained in another manner. As discussed above, this may include a default weight based on an instance type or a previously adjusted weight. Furthermore, this may include a flag to cease initialization of the virtual machine instance if fraud, abuse, or illegal activities have been previously detected in connection with the execution of virtual machine instances by the same customer requesting initialization of the new virtual machine instance. The initializing may further include initializing the virtual machine to execute an operating system and/or program code 110 as described above.

The method 300 further includes monitoring the resource utilization of the new virtual machine instance 108 at block 306. The monitoring may be performed by the VMM 102, and may include tracking resource utilization for a particular time window and comparing the tracked resource utilization to VM execution guidelines 125 for a particular virtual machine instance type.

The method 300 further includes determining if the monitored resource utilization is in violation of the VM execution guidelines associated with the particular virtual machine instance type at block 306. As mentioned briefly above, the guidelines may be based on the virtual machine instance type, and might also define resource bursting allocation metrics under normal operating conditions. For example, based on the comparison noted above, the VMM 102 may establish that the initialized virtual machine instance 108 is over-utilizing resources for a particular length of time as compared to the defined resource bursting allocation metrics, which indicates a violation of the guidelines.

The method 300 further includes, if the monitored resource utilization is in violation of the guidelines, adjusting the weight 103 associated with the particular virtual machine instance 108 at block 308. According to one embodiment, adjusting the weight includes reducing the weight 103 or a scheduling priority associated with the virtual machine instance 108 based on the violation. This may include a relatively large or small adjustment to the weight 103 or scheduling priority based on how many compute cycles have passed since the violation, how long resources were over-utilized, or any other desired or predetermined adjustment.

The method 300 further includes transmitting the adjusted weight 103 and associated virtual machine instance data 122 to centralized instance monitor 116 at block 312. The transmitting effectuates creation of a profile that may follow a customer 131 across different host computers within the service provider network 112, and allow previously adjusted weights 103 to be used in block 302 described above.

Thereafter, the method 300 includes continued monitoring of the virtual machine instance at block 306, with continued adjustment of the weight 103 as necessary. It is noted that additional adjustments are possible, including re-adjusting a weight 103 for a virtual machine instance 108 that is currently adhering to the VM execution guidelines 125. This may result in reestablishment of resource allocation privileges for virtual machine instances 108 that begin to follow associated VM execution guidelines 125 after a period of time has elapsed. As noted above, adjusted weight 103 and virtual machine instance data 122 might also be transmitted to the centralized instance monitor 116.

Figure 4:
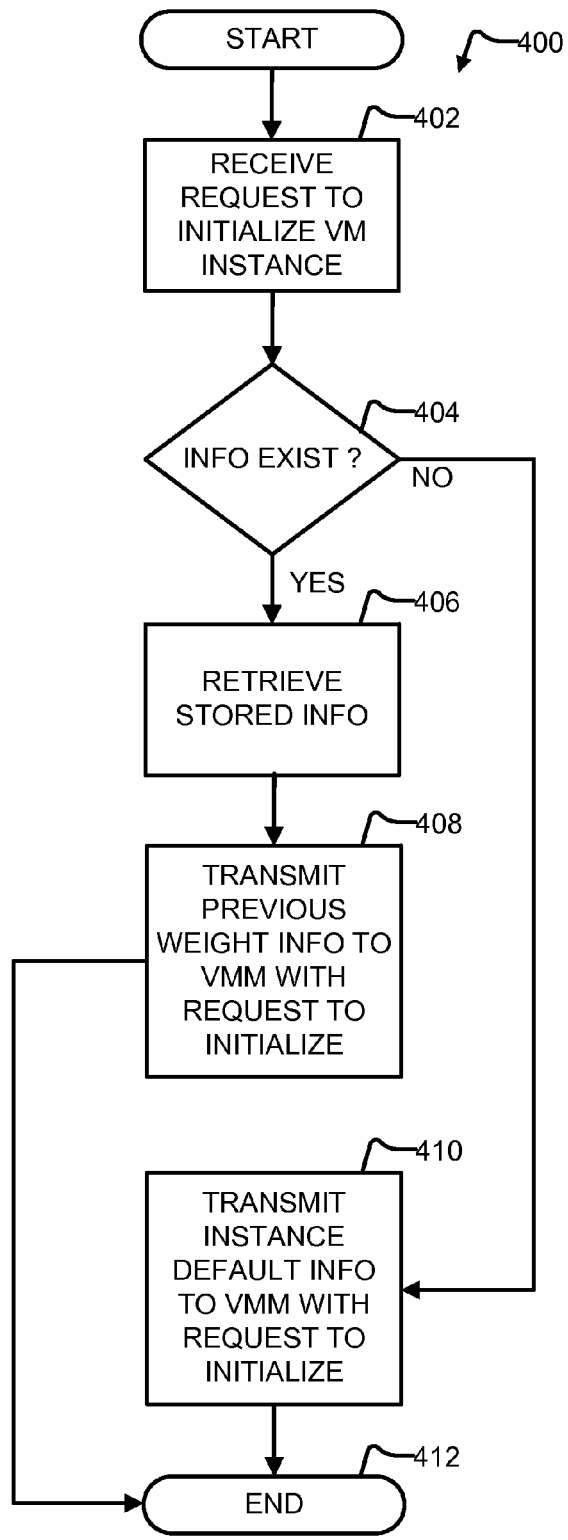
FIG. 4 is a flow diagram illustrating aspects of the operation of a centralized instance monitor, according to one embodiment disclosed herein.

FIG. 4 is a flow diagram showing a method 400 that illustrates aspects of the operation of a centralized instance monitor 116, according to one embodiment disclosed herein. As shown in FIG. 4, the method 400 includes receiving a request to initialize a virtual machine instance at block 402. For example, the request may be transmitted by a customer computing system 132 to the service provider network 116, and may include a desired virtual machine instance type, as well as associated user/customer identification information.

The method 400 further includes determining if information related to a particular customer 131 associated with the virtual machine initialization request is stored or exists at block 404. This determination may include retrieving customer and/or virtual machine instance 108 identification information from the request, and comparing it to customer and instance data 122 previously stored in centralized storage 120. Generally, the identification information includes an identification number such as a virtual machine instance identification number or a user identification number. The identification number can be generated by the service provider network 112 and associated with a particular customer. Alternate forms of identification such as names, Internet Protocol ("IP") addresses, media access control ("MAC") addresses, and other suitable identifying information that is unique to a particular customer are also applicable to some embodiments, and are considered to be within the scope of this disclosure.

The method 400 further includes, if stored information exists, retrieving the stored information related to the user and/or virtual machine instance 108 at block 406. The method 400 further includes transmitting previous dynamic weight information of the retrieved, stored information to the VMM 102 alongside a request to initialize the virtual machine instance at block 408. The method 400 also includes transmitting default virtual machine instance information to the VMM 102 alongside a request to initialize the virtual machine instance at block 410, if no stored information exists. According to one embodiment, the default virtual machine instance information includes a default initial weight.

Thereafter, the method 400 may cease at block 412. It is noted that the method 400 may include further operations not particularly illustrated, including storing virtual machine instance data 125 for future initialization requests received from VMM 102. In this manner, a history of customers 131 or virtual machine instances 108 that have violated the VM execution guidelines 125 will be readily transmitted to the VMM 102 for appropriate weighting of resource allocation requests. The stored information may be made available through method 400 in a distributed computing environment for use in managing resource bursting across disparate host computers.

Figure 5:
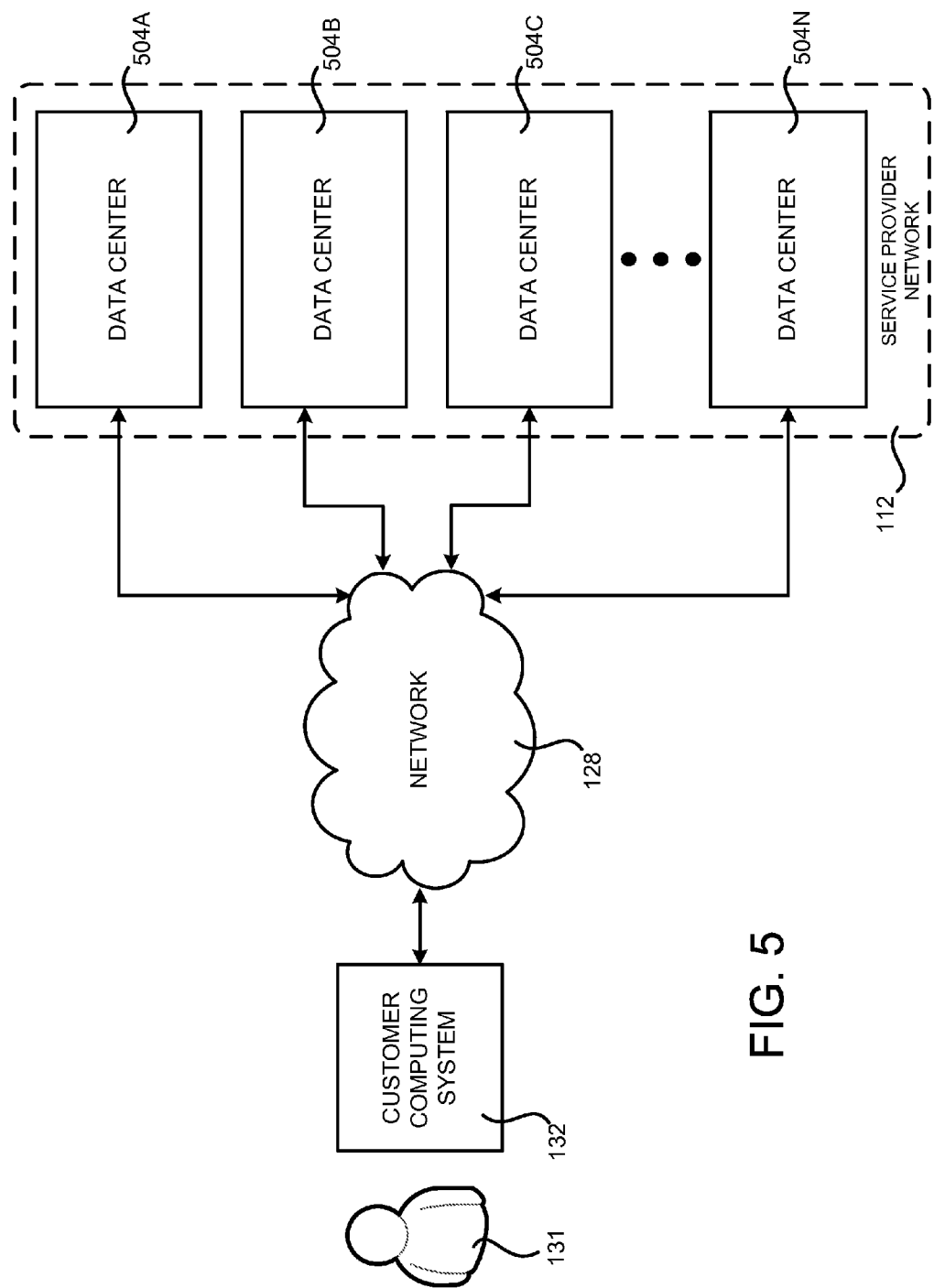
FIG. 5 is a system and network diagram that shows one illustrative operating environment for the embodiments disclosed herein that includes a service provider network that may be configured to provide the functionality described herein.

Hereinafter, distributed computing environments and computer apparatuses which may be configured to use the techniques and procedures described above are described in detail with references to FIGS. 5-8. In particular, FIG. 5 is a system and network diagram that shows one illustrative computing environment for the embodiments disclosed herein. As discussed above, the service provider network 112 can implement virtual machine instances 108 for use by customers 131 of the service provider network 112.

The virtual machine instances 108 may be configured to execute applications, including Web servers, application servers, media servers, database servers, and other types of applications. Data storage resources may also be provided, and may include file storage devices, block storage devices, and the like.

The virtual machine instances provided by the service provider network 112 are enabled in one implementation by one or more data centers 504A-504N (which may be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that implements some of the technologies disclosed herein will be described below with regard to FIG. 6.

The customers 131 and other users of the service provider network 112 may access the computing resources provided by the service provider network 112 over the network 128, such as a WAN. For example, and without limitation, a customer computing system 132 might be utilized to access the service provider network 112 by way of the network 128. It should be appreciated that a local-area network ("LAN"), the Internet, or any other networking topology known in the art that connects the data centers 504 to remote customers 131 and other users may be utilized. It should also be appreciated that combinations of such networks might also be utilized.

Figure 6:
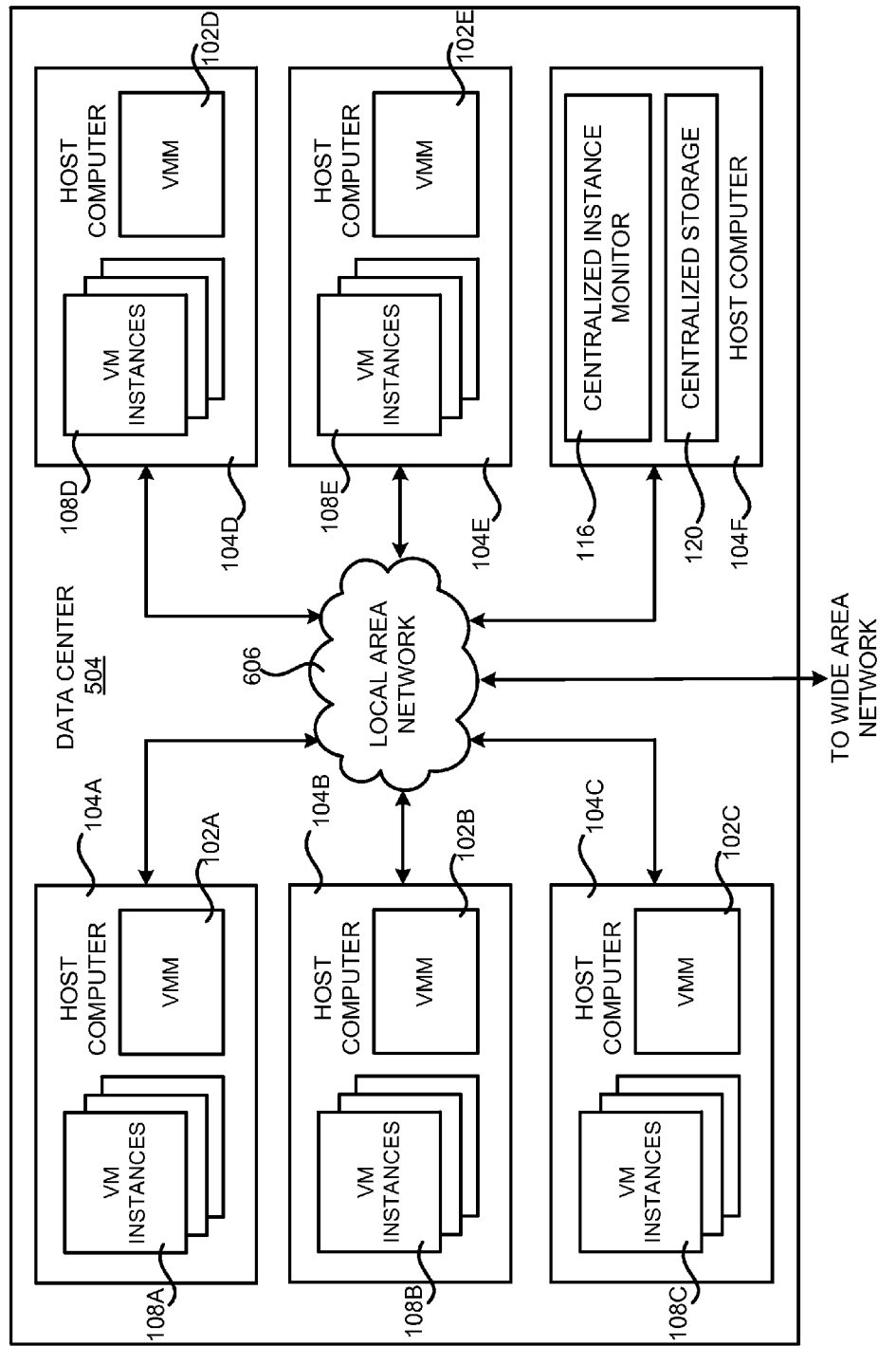
FIG. 6 is a computing system diagram that illustrates one configuration for a data center that implements aspects of the concepts and technologies disclosed herein, according to one embodiment disclosed herein.

FIG. 6 is a computing system diagram that illustrates one configuration for a data center 504 that implements aspects of the concepts and technologies disclosed herein, according to one embodiment disclosed herein. The example data center 504 shown in FIG. 6 includes several host computers 104A-104F (which may be referred to herein singularly as "a host computer 104" or in the plural as "the host computers 104") for providing virtual machine instances 108.

The host computers 104 may be standard tower, rack-mount, or blade server computers configured appropriately for implementing the virtual machine instances 108 described herein. Host computers 104 in the data center 504 might also be configured to provide other services, such as those described above and potentially others.

The data center 504 shown in FIG. 6 also includes a host computer 104F that may be utilized for executing some or all of the software components described above for providing centralized instance monitoring and associated storage. For example, and without limitation, the host computer 104F might be configured to execute the centralized instance monitor 116 and to provide centralized storage 120. The host computer 104F might also be configured to execute other components for providing some or all of the functionality described herein.

In the example data center 504 shown in FIG. 6, an appropriate LAN 606 is utilized to interconnect the host computers 104A-104F. The LAN 606 is also connected to the network 128 illustrated in FIGS. 1 and 5. It should be appreciated that the configuration and network topology illustrated in FIGS. 1, 5 and 6 has been greatly simplified and that many more computing systems, software components, networks, and networking devices may be utilized to interconnect the various computing systems disclosed herein and to provide the functionality described above. Appropriate load balancing devices or software modules might also be utilized for balancing a load between each of the data centers 504A-504N, and between each of the server computers 104A-104F in each data center 504. It should be appreciated that the data center 504 described with respect to FIG. 6 is merely illustrative and that other implementations might be utilized.

Figure 7:
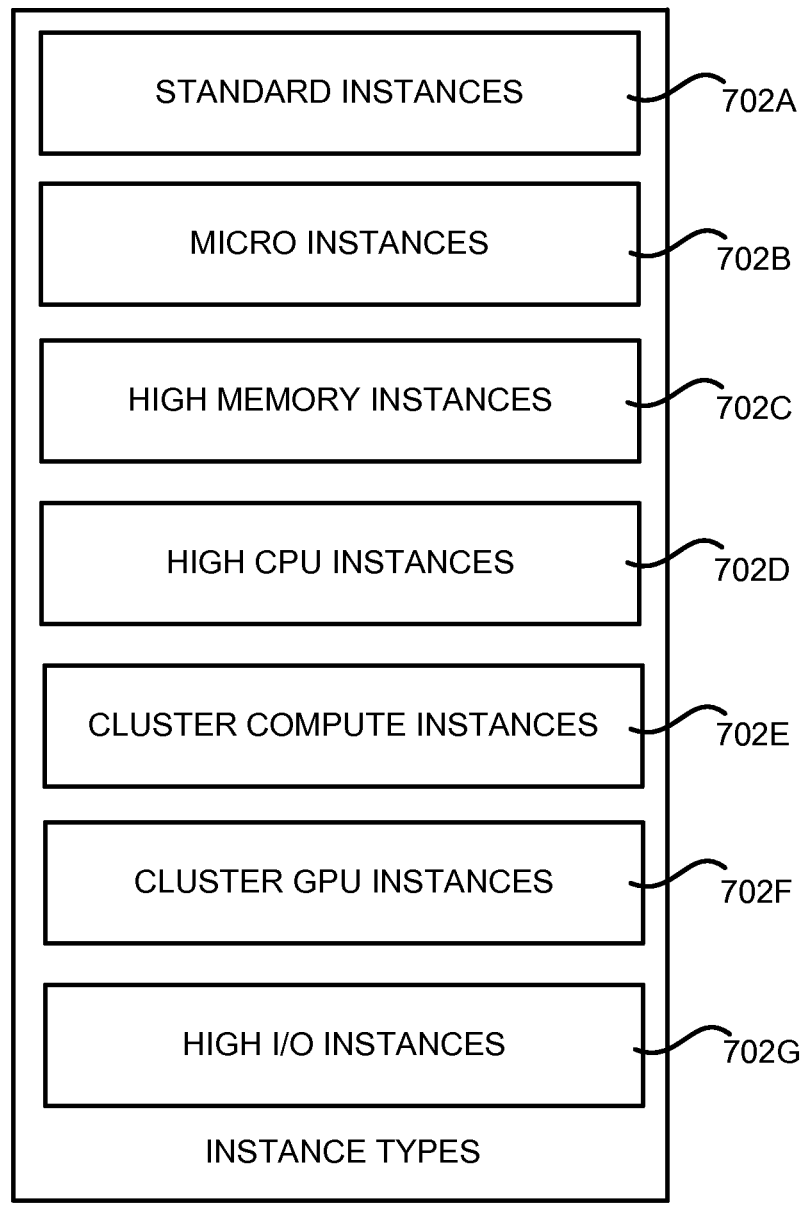
FIG. 7 is a block diagram showing aspects of various types of virtual machine instances that might be provided by a computing service provider and monitored as described herein.

FIG. 7 is a block diagram showing aspects of various types 702 of virtual machine instances 108 that might be provided by the service provider network 112 and monitored by the VMM 102 and centralized instance monitor 116 described herein. The virtual machine instances 108 provided by the service provider network 112 may be made available to customers in a number of different types, or configurations. FIG. 7 illustrates several example instance types 702 that might be made available by a service provider through a service provider network 112: standard instances; micro instances; high memory instances; high central processing unit ("CPU") instances; cluster compute instances; cluster graphics processing unit ("GPU") instances, and high input/output ("I/O") instances. Aspects of each of these instance types will be described below.

Standard instances 702A are instances that are configured with generally proportional amounts of CPU and memory. Standard instances 702A may be suitable for common computing applications. Standard instances 702A may be made available in various sizes in some embodiments. For example, "small", "medium", "large", and "extra large" instances may be made available, with each of these instances having greater amounts of CPU and memory, while maintaining approximately similar ratios of CPU to memory. It follows that VM execution guidelines 125 for standard instances 702A may stipulate limited or no resource bursting in some embodiments.

Micro instances 702B are instances that provide a small amount of consistent CPU resources and allow CPU capacity to be increased in short bursts when additional cycles are available. Micro instances 702B may be suited for lower throughput applications and Web sites that require additional compute cycles periodically. For example, micro instances 702B may be well suited for latency-bound workloads such as the workload example illustrated in FIG. 2B. Thus, micro instances 702B may include associated VM execution guidelines 125 that limit resource bursting to a periodic nature.

VMM 102 may therefore use these guidelines for the resource bursting management described above.

High memory instances 702C are instances that have proportionally more random access memory ("RAM") resources than CPU resources. High memory instances 702C may be suitable for high throughput applications, including database and memory caching applications. In contrast, high CPU instances 702D have proportionally more CPU resources than RAM memory resources and are well suited for compute-intensive applications. Thus, instances 702C and 702D may include VM execution guidelines 125 that reflect these characteristics.

Cluster compute instances 702E are instances that offer proportionally high CPU resources with increased network performance. Cluster compute instances 702E are well suited for High Performance Compute ("HPC") applications and other demanding network-bound applications. Cluster GPU instances 702F are virtual machine instances that provide general-purpose GPUs with proportionally high CPU and increased network performance for applications benefitting from highly parallelized processing, including HPC, rendering and media processing applications. While cluster compute instances 702E provide the ability to create clusters of instances connected by a low latency, high throughput network, cluster GPU instances 702F provide an additional option for applications that can benefit from the efficiency gains of the parallel computing power of GPUs over what can be achieved with traditional processors. It follows that VM execution guidelines 125 for standard instances 702E may stipulate adherence to these characteristics.

High I/O instances 702G are instances that provide very high disk I/O performance and are suited for high performance database workloads and other jobs that require high disk performance. High I/O instances 702G may utilize solid state-drive ("SSD")-based local instance storage for high I/O throughput. High I/O instances 702G might also provide high levels of CPU, memory, and network performance. It follows that VM execution guidelines 125 for high I/O instances 702G may stipulate limited or no resource bursting outside of I/O access in some embodiments.

Although described above as being applicable to the micro instance type 702B, in particular, it should be appreciated that varying forms of resource bursting and management of the same may be applicable to any of the instance types 702 described above. Furthermore, varying sub-types of the individual types described above might also be implemented. For example, and without limitation, different VM execution guidelines 125 may be implemented for different sub-types such that customers 131 and other users may choose an instance type 702 that closely meets their needs without violating the underlying guidelines. It follows that tailored monitoring based on instance sub-types is also applicable to embodiments, and therefore associated weights 103 may be adjusted based on these and other factors.

It should be appreciated that the various instance types described above are merely illustrative. Other instance types not described herein might be utilized with the various concepts and technologies described herein. Additionally, in some embodiments, virtual machine instances 108 may be made available in various sizes having continuous ratios of CPU to memory.

It should also be appreciated that the various instance types described above might be utilized with various operating systems. For example, a customer 131 of the service provider network 112 might request to execute a high CPU instance 702D executing the LINUX operating system. Similarly, a customer 131 or other user of the service provider network 112 might request to use a cluster compute instance 702E executing the MICROSOFT WINDOWS SERVER operating system. Other operating systems might also be utilized.

Figure 8:
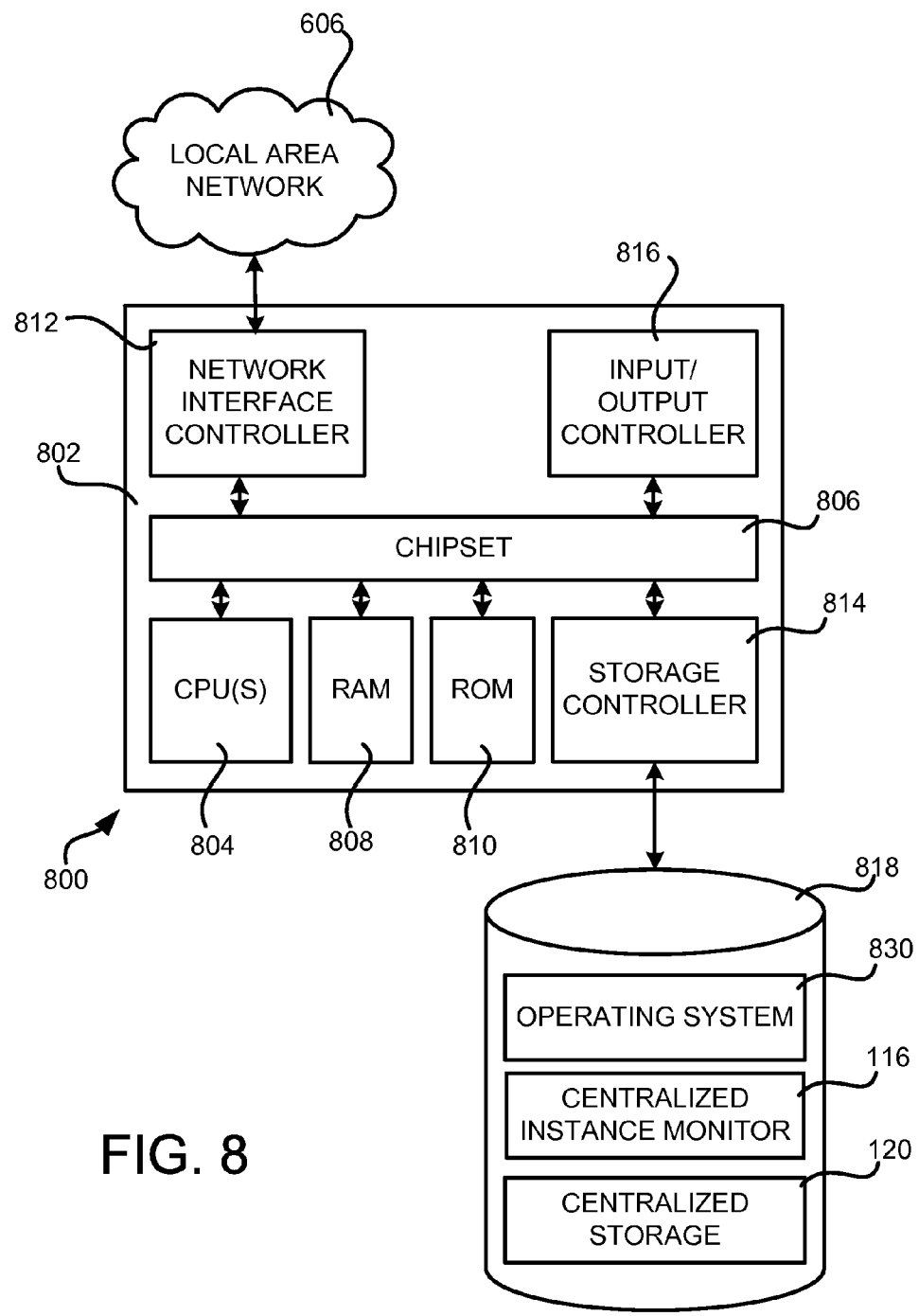
FIG. 8 is a computer architecture diagram showing an illustrative computer hardware architecture for implementing a computing device that might be utilized to implement aspects of the various embodiments presented herein.

FIG. 8 shows an example computer architecture for a computer 800 capable of executing program components in the manner described above. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 8 may be utilized to execute the methods 300 or 400. The computer architecture shown in FIG. 8 might also be utilized to implement a customer computing system 132 or any other of the computing systems described herein.

The computer 800 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the embodiments described herein.

The computer 800 may operate in a networked environment using logical connections to remote computing devices and computer systems through a network, such as the local area network 606. The chipset 806 may include functionality for providing network connectivity through a NIC 812, such as a gigabit Ethernet adapter. The NIC 812 is capable of connecting the computer 800 to other computing devices over the network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 818 may store other system or application programs and data utilized by the computer 800, such as the centralized instance monitor 116, the centralized storage 120, and/or any of the other software components and data described above. The mass storage device 818 might also store other programs and data not specifically identified herein.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various routines described above with regard to FIGS. 3 and 4. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for managing resource bursting and, potentially, other aspects of the operation of a virtual machine instance have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to implement a method comprising:
receiving a request to initialize a first virtual machine instance, the request including a virtual machine instance type and a first weight value;
initializing the first virtual machine instance on the computer by establishing a first virtual machine of the virtual machine instance type and associating the first weight value therewith, wherein the first virtual machine instance and a second virtual machine instance are associated with a first customer, and wherein a second weight value establishes a priority for resource bursting allocation to the second virtual machine instance;

monitoring resource utilization of the initialized first virtual machine instance, wherein the virtual machine instance type has associated execution guidelines for resource bursting allocation under normal conditions;

determining that the monitored resource utilization of the initialized first virtual machine instance violates the associated execution guidelines;

based on determining that the monitored resource utilization violates the associated execution guidelines, adjusting the first weight value by decreasing the first weight value, wherein the adjusted first weight value establishes a priority for resource bursting allocation to the initialized first virtual machine instance; and based at least in part on the first virtual machine instance and the second virtual machine instance being associated with the first customer, utilizing the adjusted first weight value associated with the first virtual machine instance to initialize or adjust the second weight value associated with the second virtual machine instance.

2. The non-transitory computer-readable storage medium of claim 1, wherein the request includes a virtual machine instance identification number or a user identification number associated with the first customer.

3. The non-transitory computer-readable storage medium of claim 2, wherein the method further comprises storing the adjusted first weight value with the virtual machine instance identification number or the user identification number.

4. The non-transitory computer-readable storage medium of claim 2, wherein the first weight value is a previously adjusted weight value associated with the user identification number or the virtual machine instance identification number.

5. The non-transitory computer-readable storage medium of claim 1, wherein the first virtual machine instance and the second virtual machine instance are associated with the first customer by being associated with an identification number of the first customer.

6. A computer-implemented method for managing resource allocation to virtual machine instances in a distributed computing environment, the method comprising:

receiving a request to implement a first virtual machine instance, the request including a virtual machine instance type, wherein a first weight value establishes a priority for resource bursting allocation to the first virtual machine instance, wherein a second weight value establishes a priority for resource bursting allocation to a second virtual machine instance that is different from the first virtual machine instance, and wherein a user identification number of a user is associated with the first virtual machine instance and the second virtual machine instance;

monitoring resource utilization of the second virtual machine instance;

based on monitoring the resource utilization of the second virtual machine instance, adjusting the second weight value associated with the second virtual machine instance to generate an adjusted second weight value;

based at least in part on the user identification number being associated with the first virtual machine instance and the second virtual machine instance, utilizing the adjusted second weight value associated with the second virtual machine instance to generate information for setting the first weight value;

initializing the first virtual machine instance on a computer system by (i) establishing a first virtual machine of the virtual machine instance type and (ii) associating the first weight value therewith;

monitoring resource utilization of the initialized first virtual machine instance; and adjusting the first weight value based on the monitoring the resource utilization of the initialized first virtual machine instance.

7. The method of claim 6, wherein the first virtual machine instance type includes associated execution guidelines for resource bursting allocation.

8. The method of claim 7, wherein adjusting the first weight value comprises:

determining that the monitored resource utilization of the initialized first virtual machine instance violates the associated execution guidelines; and decreasing the first weight value based on the determining.

9. The method of claim 6, wherein the first weight value is a default weight value based on the virtual machine instance type.

10. The method of claim 7, wherein adjusting the first weight value comprises:

determining that the monitored resource utilization violates the associated execution guidelines; and adjusting the first weight value based on the determining.

11. A system, comprising:

a first host computer executing a first virtual machine monitor, and a first virtual machine instance configured to utilize hardware resources of the first host computer, wherein the first virtual machine instance has associated execution guidelines for resource allocation under normal conditions; and a second host computer executing a second virtual machine monitor, and a second virtual machine instance configured to utilize hardware resources of the second host computer, wherein a user identification number of a user is associated with the first virtual machine instance and the second virtual machine instance, and wherein the first virtual machine monitor is configured to allocate the hardware resources of the first host computer to the first virtual machine instance, wherein the second virtual machine monitor is configured to allocate the hardware resources of the second host computer to the second virtual machine instance, wherein the first virtual machine monitor is further configured to, monitor resource utilization of the first virtual machine instance, and adjust a first weight value associated with the first virtual machine instance by (i) determining that the monitored resource utilization of the first virtual machine instance violates the associated execution guidelines and (ii) decreasing the first weight value based on the determining, wherein the adjusted first weight value establishes a scheduling priority for resource allocation to the monitored first virtual machine instance, and wherein the second virtual machine monitor is further configured to, based on (i) each of the first virtual machine instance and the second virtual machine instance being associated with the same user identification number and (ii) adjusting the first weight value associated with the first virtual machine instance, adjust or set a second weight value associated with the second virtual machine instance, wherein the second weight value establishes a scheduling priority for resource allocation to the second virtual machine instance.

12. The system of claim 11, further comprising:
a computer in operative communication with the one first virtual machine monitor, wherein the computer is configured to
receive the first adjusted weight value from the first virtual machine monitor, and
store the received adjusted first weight value.

13. The computing system of claim 11, further comprising a computer in operative communication with the first virtual machine monitor, wherein the system is configured to:
transmit the request to the first virtual machine monitor based on stored weight information related to the new virtual machine instance.

\* \* \* \* \*